(12) United States Patent
Allen

(10) Patent No.: US 10,093,531 B1
(45) Date of Patent: Oct. 9, 2018

(54) REMOVABLE BRACE FOR FUELING HOSE NOZZLE

(71) Applicant: Melissa L. Allen, Clarksville, IN (US)

(72) Inventor: Melissa L. Allen, Clarksville, IN (US)

( * ) Notice: Subject to any disclaimer, the term of this patent is extended or adjusted under 35 U.S.C. 154(b) by 0 days.

(21) Appl. No.: 15/597,144

(22) Filed: May 16, 2017

(51) Int. Cl.
*B65B 1/04* (2006.01)
*B67D 7/32* (2010.01)
*B60R 11/00* (2006.01)
*B67D 7/04* (2010.01)

(52) U.S. Cl.
CPC .......... *B67D 7/3245* (2013.01); *B60R 11/00* (2013.01); *B67D 7/04* (2013.01); *B60R 2011/004* (2013.01); *B60R 2011/0059* (2013.01); *B60R 2011/0075* (2013.01)

(58) Field of Classification Search
CPC ......... B67D 7/3245; B67D 7/04; B60R 11/00; B60R 2011/0059; B60R 2011/0075; B60R 2011/004
See application file for complete search history.

(56) References Cited

U.S. PATENT DOCUMENTS 5,236,023 A * 8/1993 Mohr .................. B67D 7/42
141/312

* cited by examiner

*Primary Examiner* — Jason K Niesz
(74) *Attorney, Agent, or Firm* — Shifrin Patent Law; Dan Shifrin

(57) ABSTRACT

A removable fuel handle brace is provided, comprising: a pair of parallel horizontal sides, each having a hook on an inner end bent approximately 180° in a first direction; a pair of parallel vertical sides having a first end extending from an outer end of each horizontal side approximately 90° in a second direction opposite the first direction; an upper cross-piece connecting second ends of the vertical sides; a lower cross-piece having first and second ends connected to the vertical sides between the first and second ends of the vertical sides; and a pair of horizontal extensions connected to the first and second ends of the lower cross-piece and extending in a direction towards the hooks parallel to the horizontal sides.

12 Claims, 7 Drawing Sheets

REMOVABLE BRACE FOR FUELING HOSE NOZZLE

TECHNICAL FIELD

The present invention relates generally to fueling over-the-road tractor trucks and, in particular, to a removable brace for securing a fueling hose nozzle in the fill tube opening of a fuel tank. The brace is designed for use on over-the-road tractor trucks with multiple diesel fuel tanks and allows simultaneous fueling of all tanks without the risk of the fuel nozzles falling out of the fuel tanks during fueling.

BACKGROUND ART

Over-the-road tractor trucks may have one or two diesel fuel tanks with a combined capacity of 100 to 300 gallons. Because of the angle of the fuel tank opening on many trucks and the resulting imbalance of the fuel hose and nozzle, because of the pressure of the fuel being dispensed from the hose nozzle, and because the pressure can change suddenly, it is possible for the nozzle to be forced out of the tank opening, resulting in a fuel spill and an inconvenient and unsafe condition. Consequently, it is important to keep the nozzle in the opening. While the driver may stand by each fuel tank and hold each hose handle only filling one fuel tank at a time, filling even one tank may take a quite a bit of time while filling two and possibly three tanks may take as long as 30 minutes. It is standard practice for the truck driver to be performing other important tasks, such as washing windows, checking tires, and topping off fluids while the tanks are filling. These tasks require several minutes of extra time if the drive had to hold each fuel hose handle one at a time. Importantly, a driver holding the fuel nozzle while filling the tanks is exposed to toxic diesel fumes, which is substantially avoided if the driver is even several feet from the opening of the tank while performing the other tasks.

One common method drivers use to the nozzle from falling out of the tank's fill tube opening, illustrated in FIGS. 1 and 2, is to secure the nozzle in the tank's fill tube opening 14 with a bungee cord 30 wrapped through or around the handle 20. In FIG. 1, the ends of the bungee cord 30 are hooked into openings in the step 12 of the truck 10 with the bungee cord 30 passing over the handle 20. In FIG. 2, the bungee cord 30 is wrapped around a portion of the handle 20 and the ends 32 are clipped to an edge 16 above the tank opening. However, attaching the bungee cord 30 may be difficult and it 30 may not be secure enough or may break or slip, causing the nozzle to fall out of the tank opening and spilling fuel. They may even interfere with the automatic shut-off mechanism of the pump.

FIGS. 3A, 3B, and 4 illustrate various devices 40, 50 that have also be designed. It is intended that a truck stop operator secure such devices 40, 50 onto the nozzle 20. To use, the driver inserts the end of the nozzle 20, with the end of the device 40, 50 into the tank opening. The end of the device 40, 50 hooks onto the inside of the tank and prevents the nozzle 20 from falling out. However, these devices may be awkward to use and therefore are not commonly used.

SUMMARY OF THE INVENTION

Embodiments of the present invention provide a removable fuel handle brace comprising: a pair of parallel horizontal sides, each having a hook on an inner end bent approximately 180° in a first direction; a pair of parallel vertical sides having a first end extending from an outer end of each horizontal side approximately 90° in a second direction opposite the first direction; an upper cross-piece connecting second ends of the vertical sides; a lower cross-piece having first and second ends connected to the vertical sides between the first and second ends of the vertical sides; and a pair of horizontal extensions connected to the first and second ends of the lower cross-piece and extending in a direction towards the hooks parallel to the horizontal sides.

A driver secures the brace to the truck by engaging the hooked ends with an inner edge of the truck in front of the fill tube opening. The driver may then place the nozzle in the fill tube opening and rest the handle in the brace. The two cross-pieces prevent the handle from moving backwards away from the fill tube opening and the horizontal extensions prevent the handle from moving sideways. Thus, the nozzle remains securely within the fill tube opening without further driver intervention.

DETAILED DESCRIPTION OF THE PREFERRED EMBODIMENT

The described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components and so forth. In other instances, well-known structures, materials, or operations are not shown or described in detail to avoid obscuring aspects of the invention.

Figure 1:
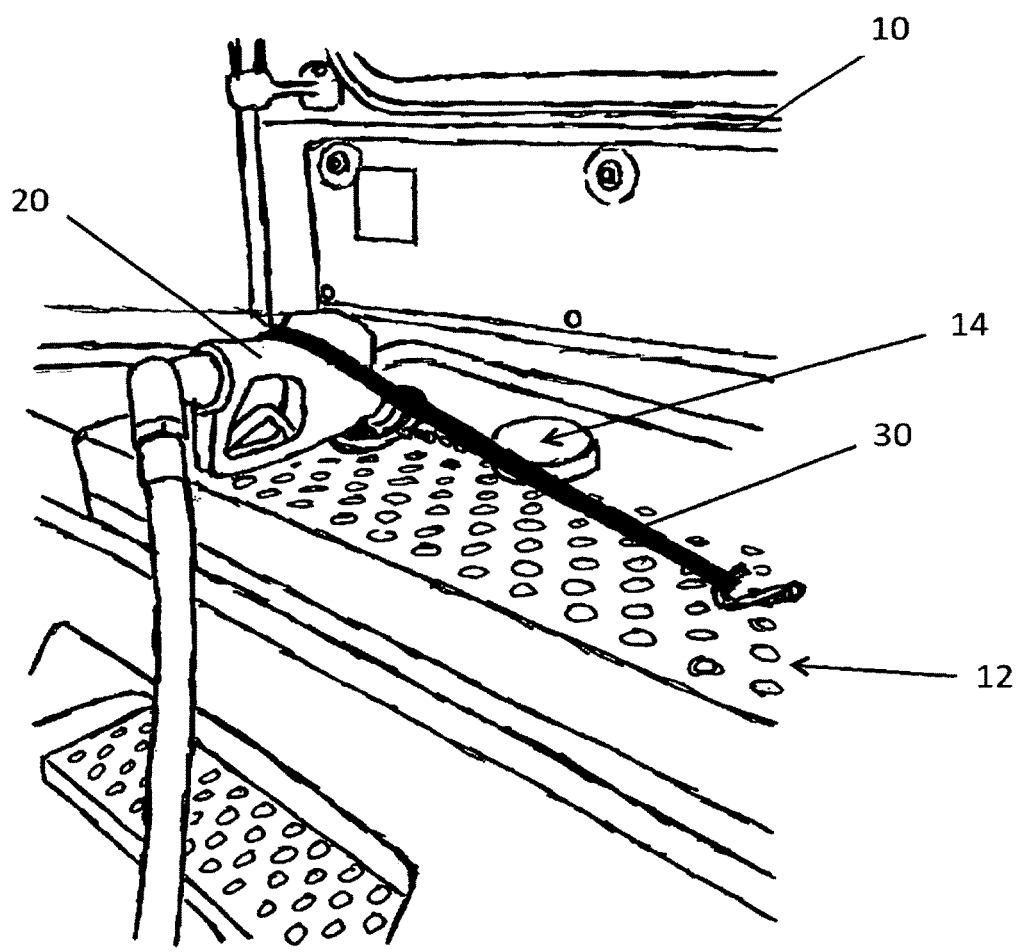
FIG. 1 illustrates a prior art method of using a bungee cord to retain a fueling hose nozzle in the fill tube opening of a fuel tank.
Figure 2:
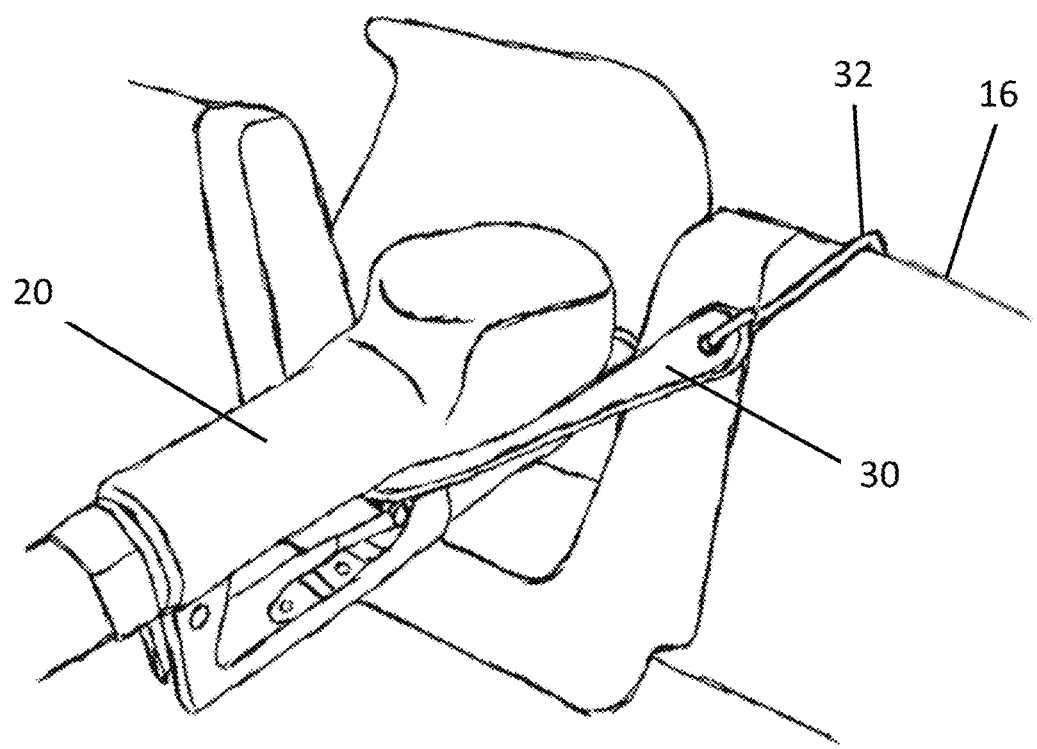
FIG. 2 illustrates another prior art method of using a bungee cord to retain a fueling hose nozzle in the fill tube opening of a fuel tank.
Figure 3A:
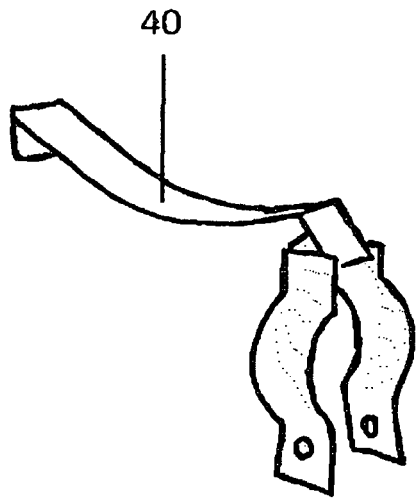
FIG. 3A illustrates a prior art device for retaining a fueling hose nozzle in the fill tube opening of a fuel tank.
Figure 3B:
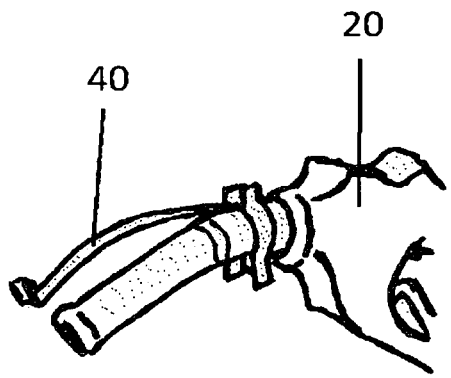
FIG. 3B illustrates the device of FIG. 3A attached to a fueling nozzle.
Figure 4:
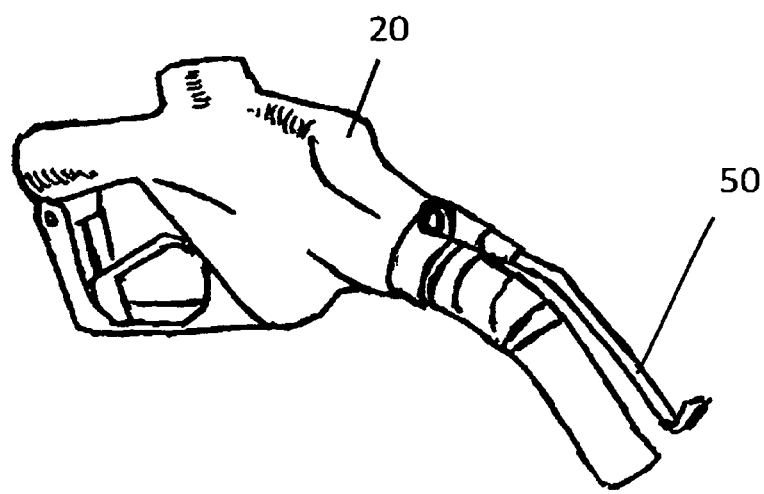
FIG. 4 illustrates another prior art device for retaining a fueling hose nozzle in the fill tube opening of a fuel tank.
Figure 5:
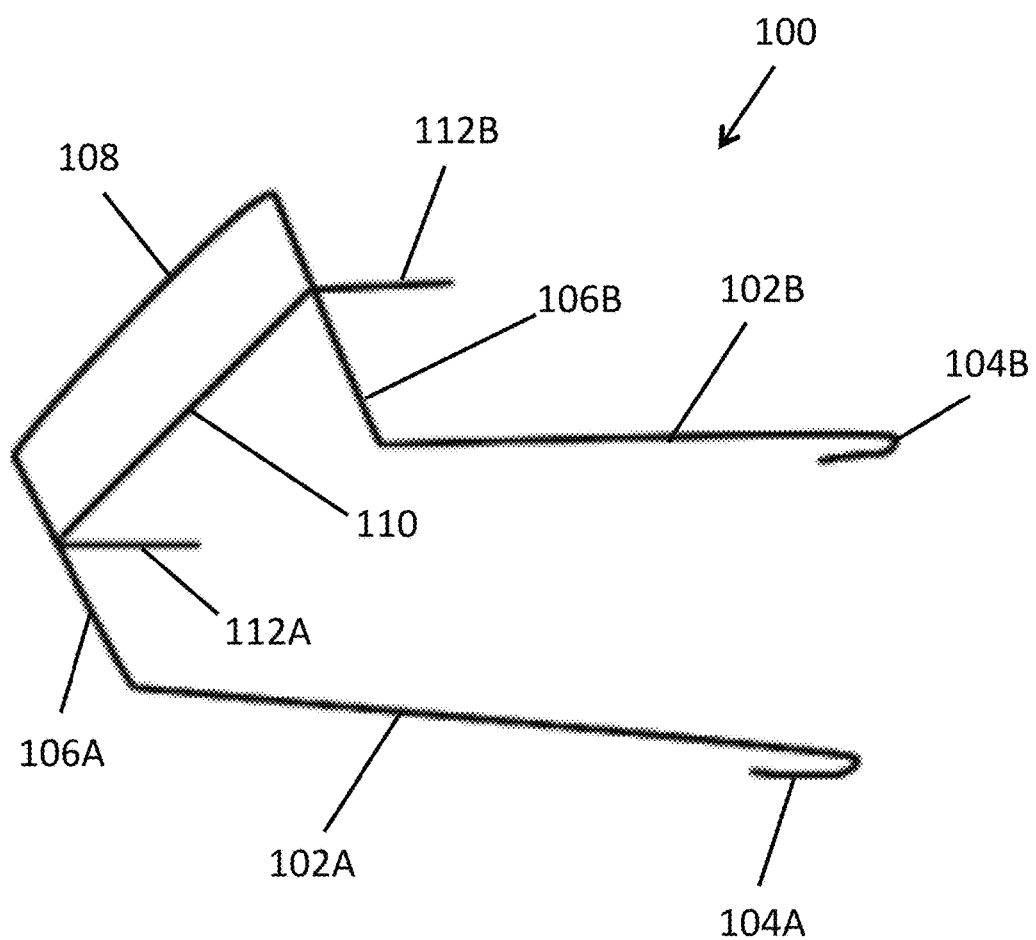
FIG. 5 illustrates an embodiment of a removable brace for securing a fueling hose nozzle in the fill tube opening of a fuel tank.

FIG. 5 illustrates an embodiment of a removable brace 100 for securing a fueling hose nozzle in the fill tube opening of a fuel tank. The brace includes a pair of parallel horizontal sides 102A, 102B having ends bent downwards approximately 180° to form hooks 104A, 104B. The other ends of the sides 102A, 102B are bent approximately 90° upward (opposite the downward bend of the hooks 104A, 104B) forming a pair of parallel vertical sides 106A, 106B. The upper ends of the vertical sides 106A, 106B are connected by an upper horizontal cross-piece 108. Middle sections of the vertical sides 106A, 106B are connected by a lower horizontal cross-piece 110. Attached to the ends of the lower cross-piece 110 are a pair of horizontal extensions 112A, 112B, which parallel the sides 102A, 102B in a direction towards the hooks 104A, 104B. It will be appreciated that the terms "horizontal" and "vertical" are used to describe the orientation of the sections of the brace 100 relative to each other and to the approximate usual orientation of the brace 100 when in use.

Figure 6:
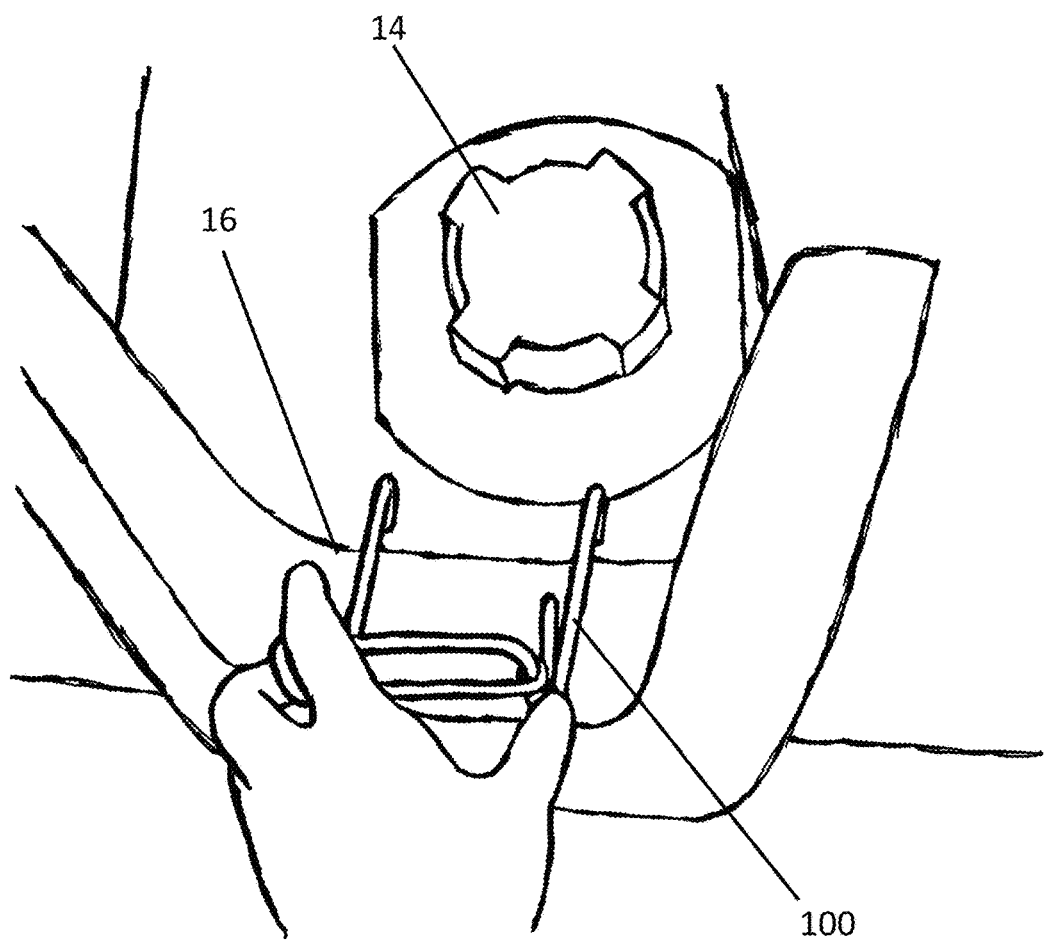
FIG. 6 illustrates the brace of FIG. 5 being secured adjacent to a filler tube opening.
Figure 7:
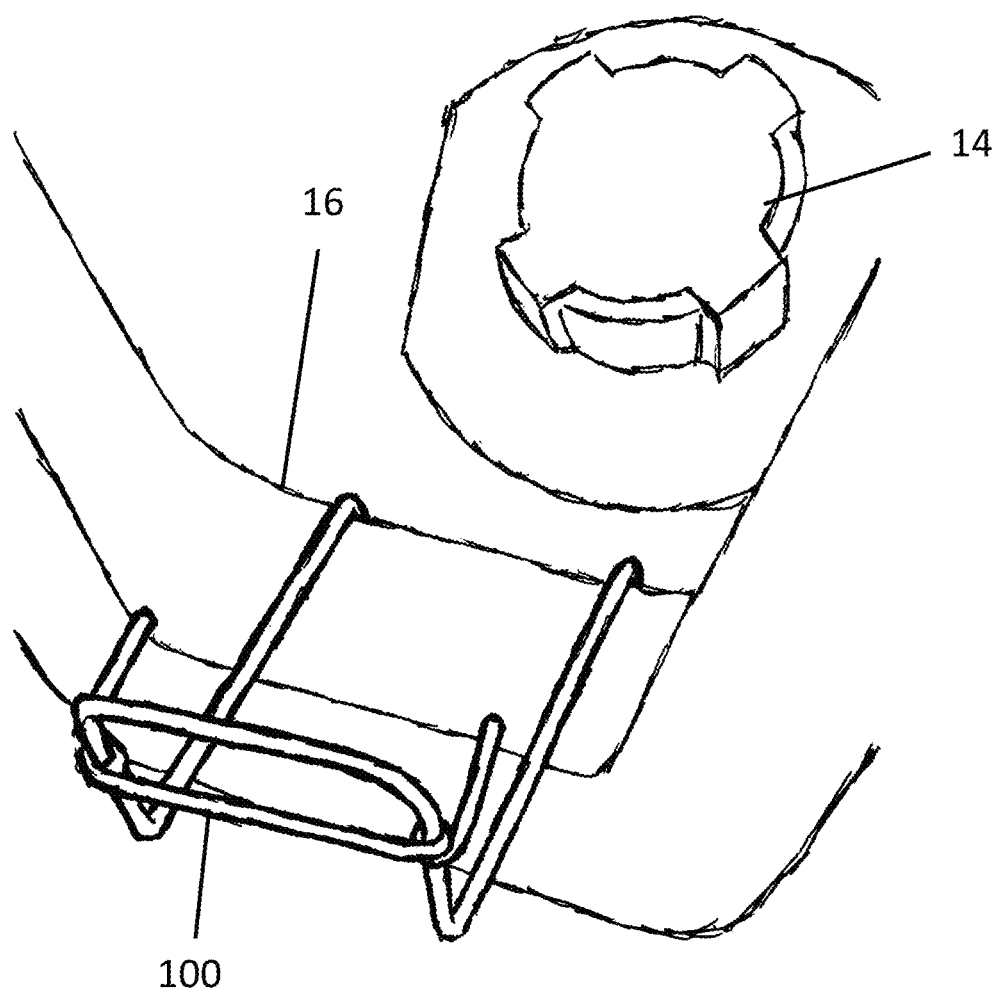
FIG. 7 illustrates the brace of FIG. 5 in place adjacent to a filler tube opening.
Figure 8:
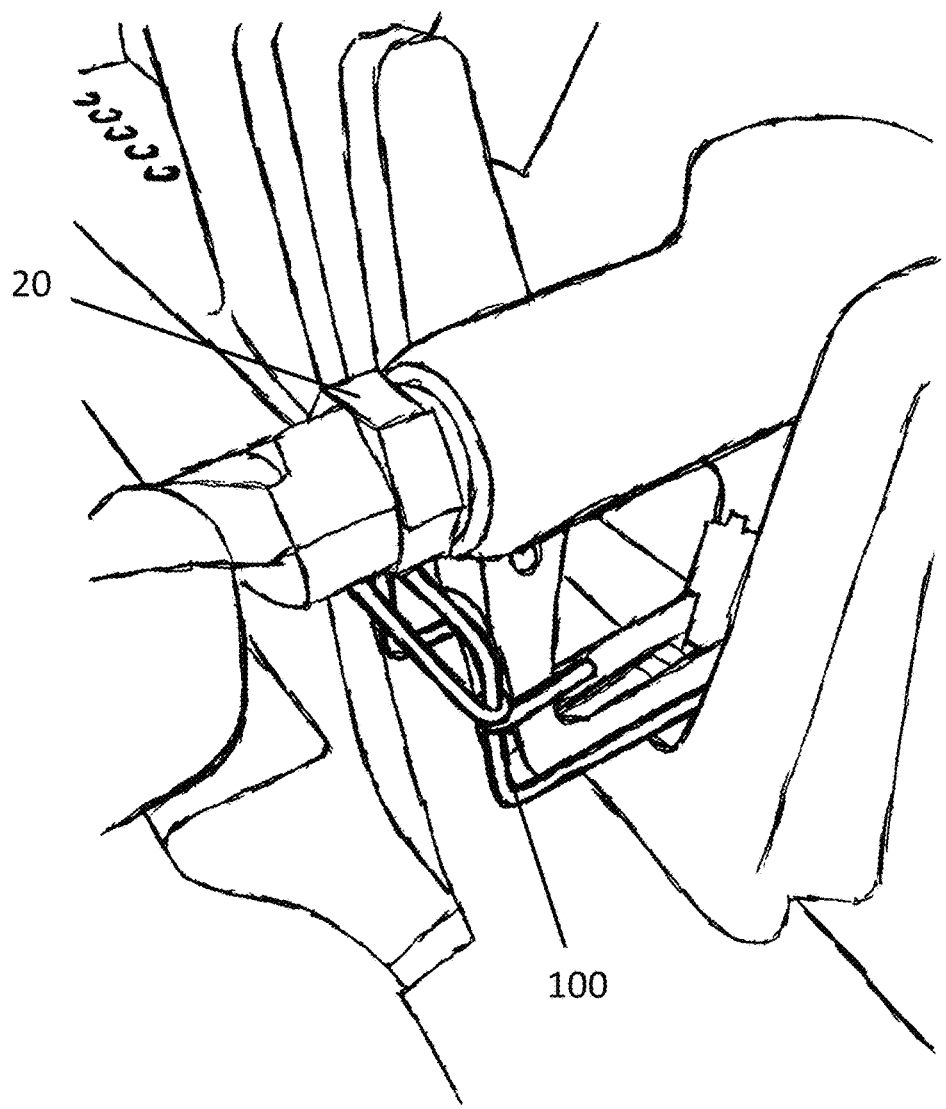
FIG. 8 illustrates the brace of FIG. 5 securing a fuel hose nozzle to the filler tube opening.

The horizontal sides 102A, 102B, hooks 104A, 104B, vertical sides 106A, 1966, and upper cross-piece 108 may be formed from a single length of stiff wire or rod with the appropriate bends. Alternatively, the aforementioned sections may be formed from separate lengths of stiff wire or rod that are secured together, such as by welding or other appropriate means. The lower cross-piece 110 and extensions 112A, 112B may also be formed from a single or separate lengths of stiff wire or rod and may be secured to the vertical sides 106A, 106B by welding (as illustrated in FIG. 5), wrapping (as illustrated in FIGS. 6-8), or other appropriate means. The brace may be formed from stiff wire, such as $1/8^{th}$ diameter steel rod, which may be coated with plastic, or brass rod. The brace may also be manufactured by injection molding using an appropriately strong material.

To use, the driver secures the brace 100 by engaging the hooked ends 104A, 104B with an inner edge 16 of the truck in front of the fill tube opening 14 (FIGS. 6, 7). The driver may then place the nozzle in the fill tube opening 14. After beginning the flow of fuel, the driver may rest the handle 20 in the brace 100, as illustrated in FIG. 8. The two cross-pieces 108, 110 prevent the handle 20 from moving backwards away from the fill tube opening 14 and the horizontal extensions 112A, 112B prevent the handle 20 from moving sideways. Thus, the nozzle remains securely within the fill tube opening 14 without further driver intervention and the driver is free to perform other tasks. When the tank is full, the nozzle will automatically shut off without being hindered by any part of the brace 100.

The description of the present invention has been presented for purposes of illustration and description, but is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A removable fuel handle brace, comprising:
   a pair of parallel horizontal sides, each having a hook on an inner end bent approximately 180° in a first direction;
   a pair of parallel vertical sides having a first end extending from an outer end of each horizontal side approximately 90° in a second direction opposite the first direction;
   an upper cross-piece connecting second ends of the vertical sides;
   a lower cross-piece having first and second ends connected to the vertical sides between the first and second ends of the vertical sides; and
   a pair of horizontal extensions connected to the first and second ends of the lower cross-piece and extending in a direction towards the hooks parallel to the horizontal sides.

2. The fuel handle brace of claim 1, wherein the horizontal sides, the vertical sides, and the upper cross-piece comprise a single rod.

3. The fuel handle brace of claim 1, wherein the lower cross-piece and the horizontal extensions comprises a single rod wrapped around the vertical sides.

4. The fuel handle brace of claim 1, wherein the first and second ends of the lower cross-piece and the horizontal extensions are connected to the vertical sides with welds.

5. The fuel handle brace of claim 1, wherein the horizontal sides, the vertical sides, and the upper cross-piece comprise plastic-coated steel rod.

6. The fuel handle brace of claim 1, wherein the horizontal sides, the vertical sides, and the upper cross-piece comprise injection-molded plastic.

7. A method of forming a fuel handle brace, comprising the steps of:
   forming a pair of parallel horizontal sides, each having a hook on an inner end bent approximately 180° in a first direction;
   forming a pair of parallel vertical sides having a first end extending from an outer end of each horizontal side approximately 90° in a second direction opposite the first direction;
   connecting an upper cross-piece to second ends of the vertical sides;
   connecting first and second ends of a lower cross-piece to the vertical sides between the first and second ends of the vertical sides; and
   connecting a pair of horizontal extensions to the first and second ends of the lower cross-piece, the horizontal extensions extending in a direction towards the hooks parallel to the horizontal sides.

8. The method of claim 7, wherein forming the pair of parallel horizontal sides comprises forming the pair of parallel horizontal sides from a first single rod.

9. The method of claim 8, wherein:
   the lower cross-piece and the horizontal extensions comprise a second single rod; and
   connecting the first and second ends of the lower cross-piece to the vertical sides comprises wrapping the second rod around the vertical sides.

10. The method of claim 7, wherein connecting the first and second ends of the lower cross-piece and the horizontal extensions to the vertical sides comprises welding the first and second ends of the lower cross-piece and the horizontal extensions to the vertical sides.

11. The method of claim 7, further comprising coating with plastic the pair of horizontal sides, the parallel vertical sides, the upper cross-piece, the lower cross-piece, and the horizontal extensions.

12. A method of using a fuel handle brace to secure a fuel hose nozzle in the fill tube opening of a truck fuel tank, comprising the steps of:
   engaging hooked ends of a pair of parallel horizontal sides of the brace with an inner edge of the truck in front of the fill tube opening;
   placing the fuel hose nozzle into the fill tube opening;
   beginning the flow of fuel; and
   resting the handle of the fuel hose in the brace;
   whereby:
      upper and lower cross-pieces connected to the horizontal sides by a pair of parallel vertical sides prevent the handle from moving backwards away from the fill tube opening; and a pair of horizontal extensions each connected at one end to one of the pair of vertical sides prevent the handle from moving sideways.

* * * * *